May 16, 1950     W. P. JATKOE ET AL     2,507,670
GRINDER SHAKER
Filed Jan. 12, 1946
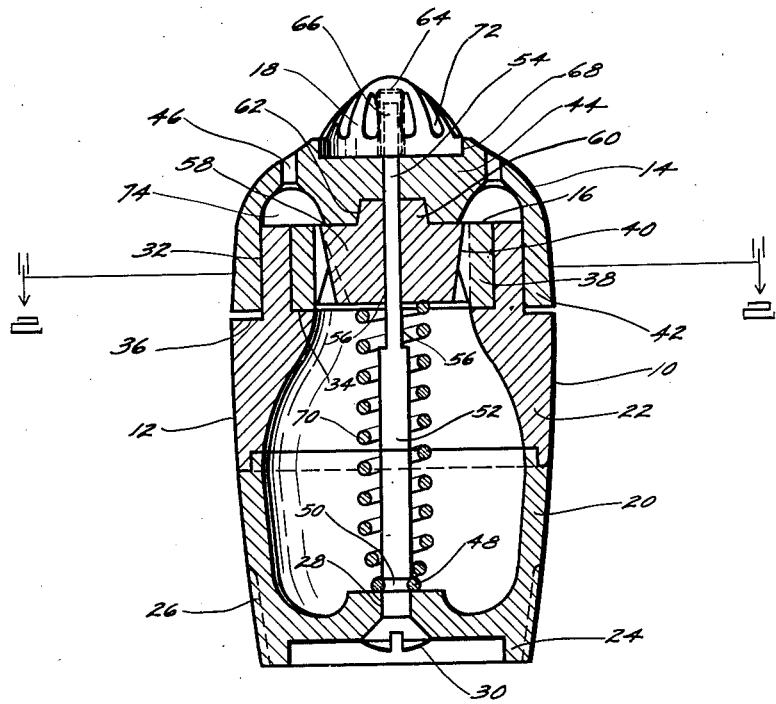
Fig. 1.
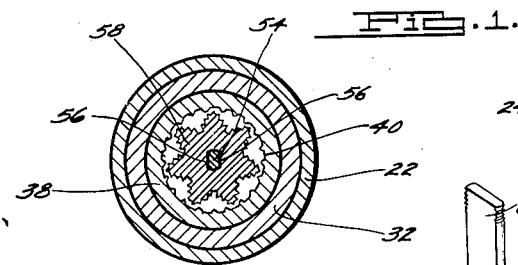
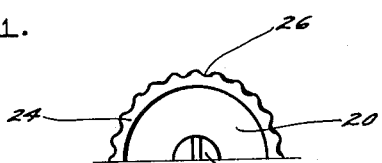
Fig. 2.     Fig. 4.
Fig. 5.
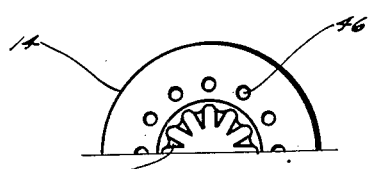
Fig. 3.
INVENTOR.
WALTER P. JATKOE
CHESTER A. KURRASH
BY
*Joseph G. Fragno*
ATTORNEY Patented May 16, 1950

2,507,670

UNITED STATES PATENT OFFICE 2,507,670

GRINDER-SHAKER

Walter P. Jatkoe, Detroit, and Chester A. Kurrash,
Redford Township, Wayne County, Mich.

Application January 12, 1946, Serial No. 640,800

2 Claims. (Cl. 241—168)

This invention relates to combined grinder-shakers and more particularly to improvements in the construction thereof.

Broadly the invention comprehends the provision of a combined mill or grinder and shaker for table use for dispensing of pepper, spices, or other condiments.

An object of the invention is the provision of a combination grinder-shaker of economical, simple, and efficient construction.

Another object of the invention is the provision of a combination grinder-shaker having means incorporated therein for adjusting the grinder to desired cutting size.

A further object of the invention is the provision of a combination condiment grinder-shaker that is constructed of a minimum of parts arranged in a manner providing a practical, easily operated, easily cleaned, and highly efficient device.

Other objects and advantages of the invention will appear from the following description taken in connection with the drawings, forming a part of the specification; and in which:

Fig. 1 is a vertical cross sectional view of the combination grinder-shaker constituting the invention;

Fig. 2 is a cross sectional view taken along line 2—2 Fig. 1;

Fig. 3 is a fragmentary top plan view of the combination grinder-shaker; and

Fig. 4 is a fragmentary bottom plan view of the combination grinder-shaker; and

Fig. 5 is an isometric view of the bolt forming a basic part of the grinder-shaker.

Combination grinder-shakers for table use have found a wide spread use in the past number of years because of the public desire to have condiments such as pepper, spices, and the like for table use at full strength and freshness for the garnishment of foods as the user so desires.

With this thought paramount, the instant invention is directed at a combination grinder-shaker that is simple of construction, easy of operation, efficient in operation, adjustable to the desired ground size of the condiment, possessing a reservoir or supply chamber for an ample supply of whole seed to be ground, and which can be readily disassembled and assembled for cleaning and supply replenishing purposes.

Referring to the drawings for more specific details of the invention, 10 represents generally a combination grinder and shaker comprising a main body 12, a shaker head 14, a grinder mechanism 16, and adjustment means 18 for the grinder 16.

The main body 12 is in the form of a cylindrical container comprising the base 20 of the shaker and an upper hollow cylindrical section 22 mounted in press fitted relation upon the base 20. The base 20 is provided with a subtended annular ledge 24 provided for supporting a grinder-shaker in normal position on a table, a plurality of axial grooves or serrations 26 the purpose of which will hereinafter appear, and a central bore 28 for the receipt of a bolt 30 therein.

The section 22 is provided with a reduced cylindrical portion 32 and internal and external shoulders 34 and 36 respectively.

The container comprising base 20 and section 22 constitutes the supply chamber or reservoir for the whole seed and is here shown as made of two parts such that the individual parts 20 and 22 can be of simple molded plastic construction.

The section 22 supports in pressed relation internally of cylindrical portion 32 thereof in abutting relationship upon shoulder 34 a cutter or grinder 38 having appropriate teeth 40 and externally of cylindrical portion 32 mounts in axial sliding and rotative relation the shaker head 14.

The shaker head 14 having the external shape of a cup comprises an annular cylindrical portion 42 externally embracing cylindrical portion 32 of section 22 and a central hub 44, said hub 44 having a plurality of equi-spaced circumferential shaker holes 46 through which the ground seed or condiment is adapted to pass.

The bolt or screw 30 is mounted in the base 20 and secured from axial movement thereon by a coil 48 of a spring to be hereinafter described fitted in a groove 50 in the main body shaft 52 of the bolt, said bolt having a reduced extended section 54 provided with a pair of flats 56 upon which is mounted for sliding non-rotative movement relative thereto an inner cutter or grinder toothed member 58 adapted to cooperate with the toothed member 38 for grinding action therewith.

The head 14 is also mounted upon the bolt section 54 for sliding non-rotative movement upon the flats 56 thereof and is adapted to receive a reduced portion 60 of cutter 58 in a shallow bored section 62 thereof in abutting relation thereto.

The adjustment means 18 is in the form of a knob 64 threaded upon an extremity 66 of the bolt 30 opposite from the end secured in the base 20 and is adapted to adjust the relative cutting position of the cutters 38 and 58, said cutter 58 and head 14 being resisted from movement in a direction toward cutter 38 by a light coil spring 70 interposed between the bottom internal wall of base 20 with coil 48 thereof seated in groove 50 of bolt 30 adjacent the wall of base 20 and cutter 58 within the supply chamber of body 12.

The adjusting knob 64 is provided with axial grooves or serrations 72 so that the desired cutting or grinding space between cutters 38 and 58 can be readily and easily made merely by turning the knob relative to the bolt 30.

Because of the effective arrangement of parts making up this combination grinder-shaker, it is possible to make all the parts of the device with the exception of the cutters, bolt, and spring from injection molded plastics thus providing an effective, efficient grinder-shaker while at the same time minimizing the cost of manufacture thereof.

In using the grinder-shaker with a supply of whole seed, kernel, grain, or beans of the desired condiments in the supply chamber thereof and the grinder-shaker being completely assembled as shown by Fig. 1, the grinder-shaker is inverted from the position shown in Fig. 1 and by simple rotation of the container, the serrations on the base providing a gripping means and so rotating the container relative to the shaker head 14, relative rotation occurs between the cutters 38 and 58 resulting in drawing the whole seed therebetween and pulverizing the seed to a fineness in accordance with the spacing of the cutters, said pulverized seed in turn falling into an annular cavity 74 in the head 14 connected with the shaker holes 46, thence through the holes 46 onto the food upon which it is desired to deposit the pulverized seed or condiment. Should the expelled condiment be too fine or coarse, it is merely necessary to turn the knob 64 relative to the shaker head and bolt in the proper direction, clockwise or counterclockwise, so as to move the cutter 58 toward or away from cutter 38 as the desired case may be.

After the supply of whole seeds is exhausted from the supply chamber of the container or it is desired to clean the grinder-shaker, it is only necessary to totally unscrew knob 64 from the bolt 30 and slide the head 14 and cutter 58 from the bolt thus exposing the interior of the container for easy cleaning or replenishment of supply while at the same time also having the cutters exposed for cleaning.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. A combination grinder-shaker for table use comprising a cylindrical container having a closed end and an open end, a cutter element fixed in the open end of the container, a central post mounted concentrically on the closed end of the container for rotation relative thereto and extending axially within the container, a cup-shaped member telescoping the container at the open end thereof having a plurality of openings therethrough adapted to communicate with the interior of the container and mounted for solely axial movement relative to the post, a second cutter element mounted on the post for solely axial movement relative thereto and conjointly with the cup shaped member adapted to cooperate with the other cutter element, and a spring arranged in the container between the closed end thereof and the second cutter element biasing it outwardly away from the first cutter element.

2. A combination grinder-shaker for table use comprising a cylindrical container open at one end and closed at the other, a cup-shaped, perforated member telescoping the container at the open end thereof, a central post journalled in the closed end of the container and extended axially internally of the container through the cup shaped member terminating in a threaded portion, a pair of cooperative cutting elements one fixed in the open end of the container and the other mounted centrally upon the post solely axially slidable relative thereto and in abutting relationship to the cup-shaped member, said cup-shaped member being limited to axial movement relative to the post, a resilient element interposed between the rotatable cutter element and closed end of the container biasing the cutters apart, and adjustment means threaded upon the extremity of the post opposite from the closed end of the container in abutting relation to the cup shaped member for adjusting the cutting elements to relative cutting position, said rotatable cutter element having cutting edges converging toward the closed end of the container.

WALTER P. JATKOE.
CHESTER A. KURRASH.

REFERENCES CITED

The following references are of record in the file of this patent:

UNITED STATES PATENTS

| Number | Name | Date |
|---|---|---|
| 386,722 | Ripley | July 24, 1888 |
| 2,166,725 | Mandery | July 18, 1939 |
| 2,184,719 | Mantelet | Dec. 26, 1939 |
| 2,407,808 | Bivans | Sept. 17, 1946 |

FOREIGN PATENTS

| Number | Country | Date |
|---|---|---|
| 27,692 | Great Britain | Dec. 26, 1939 |
| 639,714 | France | Mar. 17, 1928 |